(12) United States Patent
Hui et al.

(10) Patent No.: US 10,962,365 B2
(45) Date of Patent: Mar. 30, 2021

(54) MAGNET MOUNTING AND RETENTION SYSTEM FOR TOOL

(71) Applicant: Milwaukee Electric Tool Corporation, Brookfield, WI (US)

(72) Inventors: HongPing Hui, Dongguan (CN); XingLong Wang, Linyi (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 98 days.

(21) Appl. No.: 16/395,470

(22) Filed: Apr. 26, 2019

(65) Prior Publication Data

US 2019/0316906 A1    Oct. 17, 2019

Related U.S. Application Data

(63) Continuation of application No. PCT/US2019/026997, filed on Apr. 11, 2019.

(30) Foreign Application Priority Data

Apr. 11, 2019  (CN) .......................... 201810326409.0

(51) Int. Cl.
*G01C 9/28* (2006.01)

(52) U.S. Cl.
CPC ..................... *G01C 9/28* (2013.01)

(58) Field of Classification Search
CPC ..................................................... G01C 9/28
USPC .................................................. 33/347, 370
See application file for complete search history.

(56) References Cited

U.S. PATENT DOCUMENTS

| | | |
|---|---|---|
| 2,535,791 A | 12/1950 | Fluke |
| 2,695,949 A | 11/1954 | Cuningham |
| 2,789,363 A | 4/1957 | Miley |
| 2,790,069 A | 4/1957 | Alexander |
| 3,103,749 A | 9/1963 | Dillemuth |
| 3,186,099 A | 6/1965 | Florko, Jr. |
| 3,435,533 A | 4/1969 | Whitfield |
| 3,832,782 A | 9/1974 | Harms |
| 4,590,682 A | 5/1986 | Koch |
| 4,593,475 A | 6/1986 | Mayes |
| 4,970,796 A | 11/1990 | Stevens |

(Continued)

FOREIGN PATENT DOCUMENTS

| | | |
|---|---|---|
| JP | 3571894 B2 | 9/2004 |
| WO | WO9713119 | 4/1997 |

OTHER PUBLICATIONS

International Search Report and Written Opinion for PCT/US2019/026997 dated Jul. 19, 2019, 10 pages.

*Primary Examiner* — George B Bennett
(74) *Attorney, Agent, or Firm* — Reinhart Boerner Van Deuren s.c.

(57) ABSTRACT

A tool, such as a level, with magnets embedded in a working surface is provided. For example, the magnets assist in coupling the level to magnetic workpieces. The magnets are placed in a chamber with a floor having a periphery and internal walls extending from the floor periphery. Flanges extend from internal wall of the chamber toward a central axis or point and partially further define the chamber volume. Flanges may be created by depressing surface of the level near the chamber, thus deforming the level body surface to create a channel and a flange from the material displaced from the channel.

20 Claims, 7 Drawing Sheets

(56) References Cited

U.S. PATENT DOCUMENTS

| | | |
|---|---|---|
| 5,755,037 A | 5/1998 | Stevens |
| 6,029,360 A * | 2/2000 | Koch ................. G01C 9/28 33/381 |
| 6,568,095 B2 | 5/2003 | Snyder |
| 6,792,686 B2 | 9/2004 | Krehel et al. |
| 6,836,973 B1 * | 1/2005 | Eccles, Jr. ............ G01C 9/28 33/374 |
| 6,918,187 B2 | 7/2005 | Schaefer |
| 7,028,413 B2 | 4/2006 | Filipescu |
| 7,089,676 B2 | 8/2006 | Godinez |
| 7,204,029 B2 | 4/2007 | Tran et al. |
| 7,316,074 B2 | 1/2008 | Tran et al. |
| 7,363,719 B2 | 4/2008 | Levinson et al. |
| 7,530,175 B2 | 5/2009 | Strutt et al. |
| 7,963,044 B1 | 6/2011 | Bartholomew |
| 8,061,051 B2 | 11/2011 | Allemand |
| 8,087,177 B2 | 1/2012 | Peter et al. |
| 8,413,342 B2 | 4/2013 | Christianson |
| 8,484,856 B1 | 7/2013 | Webb et al. |
| 8,621,760 B2 * | 1/2014 | Norelli .................. G01C 9/28 33/371 |
| 8,910,390 B2 | 12/2014 | Steele et al. |
| 9,021,710 B2 | 5/2015 | Silberberg |
| 9,068,827 B2 | 6/2015 | Webb et al. |
| 9,234,751 B2 | 1/2016 | Silberberg |
| 9,243,907 B2 | 1/2016 | Silberberg |
| 9,360,315 B2 | 6/2016 | Silberberg |
| 9,546,867 B2 | 1/2017 | Borg |
| 2006/0021239 A1 * | 2/2006 | Brown ................. G01C 9/28 33/365 |
| 2006/0107541 A1 | 5/2006 | Godinez |
| 2006/0283031 A1 * | 12/2006 | Ming ..................... G01C 9/28 33/347 |
| 2008/0263880 A1 | 10/2008 | Hess |
| 2010/0223795 A1 * | 9/2010 | Chisholm ............ G01B 3/566 33/290 |
| 2012/0222321 A1 | 9/2012 | Christianson |
| 2013/0192075 A1 | 8/2013 | Sanchez |
| 2013/0269196 A1 * | 10/2013 | Steele ................... H02G 1/00 33/379 |
| 2013/0305548 A1 | 11/2013 | Borg |
| 2013/0305549 A1 | 11/2013 | Lueck |
| 2014/0173923 A1 * | 6/2014 | Van Bortel ............ A47G 1/22 33/379 |
| 2015/0096182 A1 | 4/2015 | Silberberg |
| 2015/0113819 A1 | 4/2015 | Silberberg |
| 2015/0308820 A1 | 10/2015 | Silberberg |
| 2016/0025490 A1 * | 1/2016 | Hoppe .................. G01C 9/26 33/381 |
| 2016/0054124 A1 * | 2/2016 | Schaefer ............... G01C 9/32 33/354 |
| 2016/0091310 A1 | 3/2016 | Borg |
| 2017/0003127 A1 | 1/2017 | Laesser et al. |
| 2017/0082432 A1 | 3/2017 | LaSota et al. |
| 2020/0025565 A1 * | 1/2020 | Lins ..................... G01C 9/28 |

\* cited by examiner

MAGNET MOUNTING AND RETENTION SYSTEM FOR TOOL

CROSS-REFERENCE TO RELATED PATENT APPLICATION

The present application is a continuation of International Application No. PCT/US2019/026997 filed on Apr. 11, 2019, which claims the benefit of and priority to Chinese Application No. 201810326409.0 filed on Apr. 12, 2018, which are incorporated herein by reference in their entireties. The present application also claims the benefit of and priority to Chinese Application No. 201810326409.0, filed Apr. 12, 2018, which is incorporated herein by reference in its entirety.

BACKGROUND OF THE INVENTION

The present invention relates generally to the field of tools. The present invention relates specifically to a tool, such as a level, a spirit level, a billet torpedo type level, a block torpedo type level, etc., with one or more magnetic components configured to couple the level to a magnetic structure or workpiece. Levels, such as spirit levels, are used to determine the levelness of a structure, surface or workpiece. In use the level is placed on or in contact with a surface to be measured, and the user views the location of a bubble within a vial relative to markings that indicate the levelness of the structure, surface or workpiece.

SUMMARY OF THE INVENTION

One embodiment of the disclosure relates to a tool, specifically a level, including a magnet located to facilitate using the level. In various embodiments, the tool is a level with a surface, such as a planar base surface, configured to engage a surface of a workpiece.

In various embodiments, the level includes a level body with a magnet located in a chamber, such as a bore hole, in a planar surface that is placed adjacent a workpiece. The level may include more than one magnet located along a working surface (e.g., a base surface, a top surface, etc.) of the level, such as having a magnet near each end of the level.

The chamber is defined by a floor surface and a surface of a wall that extends from a periphery of the floor to the working surface of the level. The level includes a compressible component located within the chamber and contacting the floor surface, and a magnet located in the chamber such that a lower surface of the magnet faces the compressible component. In one embodiment, a component of magnetic material (e.g., certain types of steel) is placed between the magnet and the compressible component. After the magnet is placed in the chamber volume, a flange is created by deforming a material of the level's surface to create a channel and the flange. The flange protrudes from the internal wall toward a middle of the chamber such that a lower surface of the flange overlaps an upper surface of the magnet such that the magnet is retained within the chamber. In one embodiment, two ends of the chamber are arcuate shaped and are connected via straight sidewalls giving the chamber a generally rectangular shape.

The distance between flanges on opposing sides of the chamber is less than the width of the magnet that was placed in the chamber. As a result, the flanges secure the magnet in the chamber. Immediately around the flange a channel is created from which the material creating the flange was sourced.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Referring generally to the figures, various embodiments of a level, such as a spirit level, are shown. In general, levels have one or more precision surfaces used for engagement with a workpiece during leveling. The level discussed herein includes one or more magnets on an engagement surface of the level.

The one or more magnets facilitate retention of the engagement surface of the level against a magnetic workpiece. After a magnet is placed in a chamber in the level, a press fixture is used to stamp the level metal body surrounding the chamber to flare a portion of the metal body, forming a flange that retains the magnet in the chamber. The single piece construction (e.g., continuous and/or contiguous) of the material surrounding the chamber and the flange does not require adhesives to secure the magnet in the chamber.

Figure 1:
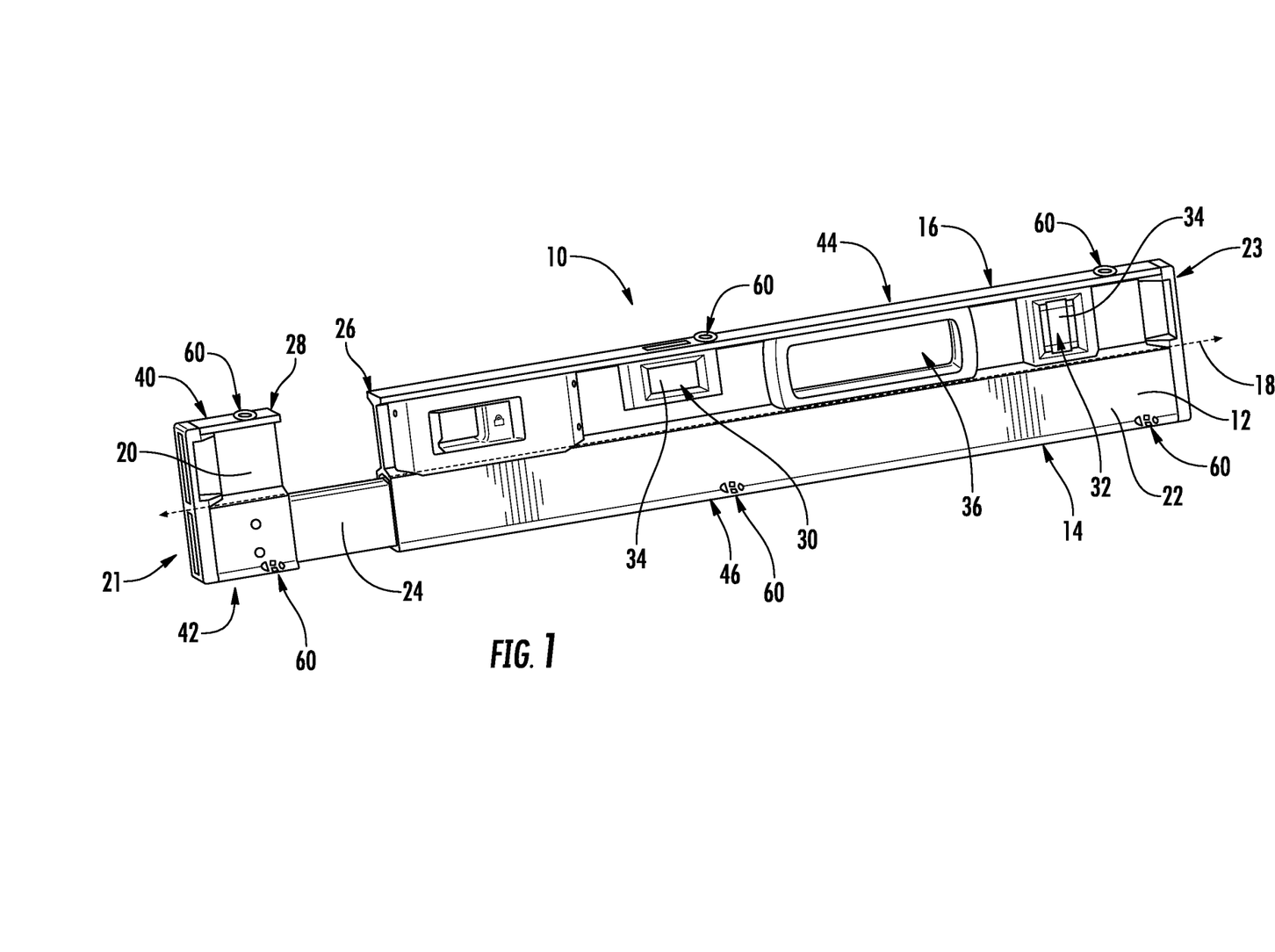
FIG. 1 is a perspective view of a level with a magnet chamber, according to an embodiment.

Referring to FIG. 1, an extendable, expandable or length-adjustable level, such as level 10, is shown according to an exemplary embodiment. In general, level 10 is extendable in that its length is reversibly adjustable allowing the user to increase and decrease the length of level 10 as may be needed for various uses.

In general, level 10 includes an outer body 12 that includes a base surface 14 and an opposing top surface 16. Base surface 14 and top surface 16 are flat, planar surfaces that can be used to engage a surface of a workpiece to be measured using level 10. In some specific embodiments, base surface 14 and/or top surface 16 are machined to have a flat, flush or planar surface following formation of outer body 12 (e.g., following extrusion of a metal forming outer body 12), and in some embodiments, this machined surface may be anodized. Surfaces 14 and 16 may be referred to as working surfaces of level 10. Surfaces 14 and 16 are planar surfaces that are parallel to each other and are also parallel to a longitudinal axis 18 of level 10.

Outer body 12 includes a first portion, shown as fixed portion 20, and a second portion, shown as slidable portion 22. In general, fixed portion 20 is rigidly and/or permanently coupled to inner body 24 at a first end 21 of level 10, and slidable portion 22 slidably engages inner body 24. Slidable portion 22 defines a second end 23 of level 10 located at the end of slidable body member 22 opposite from fixed portion 20. In general, to expand level 10, slidable portion 22 is moved along inner body 24 away from fixed portion 20 along longitudinal axis 18, and to retract/collapse level 10, slidable portion 22 is moved along inner body 24 toward fixed portion 20.

In some embodiments, inner body 24 is sized such that its entire length fits within slidable portion 22. Thus, when level 10 is moved to the fully retracted or collapsed position, an inward facing edge 28 of fixed portion 20 abuts an inward facing edge 26 of slidable portion 22. In this completely collapsed position, fixed portion 20 and slidable portion 22 come together completely covering inner body 24.

Referring to FIG. 1, level 10 includes a plurality of bores formed in slidable body portion 22. As shown in FIG. 1, level 10 includes a first vial opening 30, a second vial opening 32 and a handhold opening 36 formed through slidable portion 22 of outer body 12. Openings 30 and 32 each receive an orientation measuring component, such as a level vial 34 (e.g., bubble vials, spirit vials, etc.) which are supported by slidable body portion 22, such as being supported indirectly by intermediate components, in an appropriate orientation relative to surfaces 14 and/or 16 in order for the vials to indicate the angle, levelness, degree of plumb, etc. of the corresponding surface of a workpiece, as needed for a particular level design or level type. It should be understood, that level 10 may include less than two level vials (and correspondingly less than two openings 30, 32) or more than two level vials (and correspondingly less than two openings 30, 32) as may be desired for a particular level design. Further, level 10 may be equipped with other level sensing and indicating devices other than spirit level vials. For example, level 10 may be equipped with digital/electronic level sensors and display(s) instead of or in addition to level vials 34.

To allow level 10 to provide planar working surfaces at different lengths, the upper and lower surfaces of fixed portion 20 and of slidable portion 22 are coplanar with each other. Specifically, fixed portion 20 includes an upper surface 40 and a lower surface 42, and slidable portion 22 includes an upper surface 44 and a lower surface 46. Upper surface 40 is coplanar with upper surface 44, and/or lower surface 42 is coplanar with lower surface 46. In this arrangement, upper surface 40 and upper surface 44 operate together providing upper working surface 16 of level 10 at all adjustable lengths of level 10, from fully extended to fully retracted. Similarly, lower surface 42 and lower surface 46 operate together providing base surface 14 of level 10 at all adjustable lengths of level 10, from fully extended to fully retracted.

Top surface 16 of level 10 includes one or more magnets 60 or magnetic circuits 61. For example, one magnet 60 on top surface 16 is located near first end 21 of level 10, one magnet 60 on top surface 16 is located near second end 23 of level 10, and one magnet 60 on top surface 16 is located near the longitudinal middle of level 10. Base surface 14 of level 10 also includes one or more magnets 60 at similar locations as magnets 60 located on top surface 16.

Figure 2:
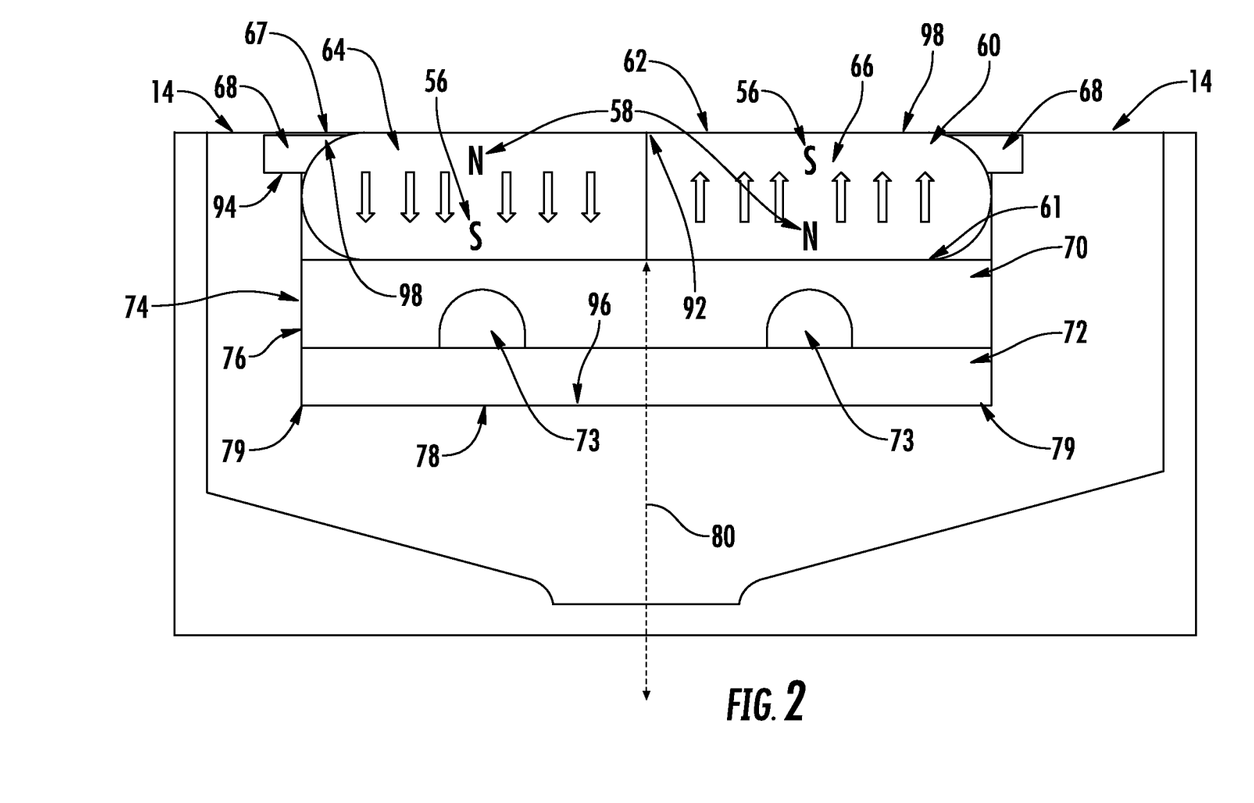
FIG. 2 is a cross-sectional view of a magnet chamber disposed in the bottom surface of the embodiment of level in FIG. 1.

Referring to FIG. 2, details of a chamber, shown as chamber 74, located within the level body for holding and retaining magnets 60 with the level body are shown in detail. It should be understood, that while chamber 74 is described in terms of a magnet located along bottom surface 14, magnet chambers located along top surface 16 can have the same structure. Chamber 74 includes floor surface 78 with periphery 79. An internal wall surface 76 extends from periphery 79 to bottom surface 14. Collectively, floor surface 78 and internal wall surface 76 define chamber volume 80. Compressible component 72, such as rubber, is placed in chamber volume 80 adjacent to floor surface 78 and includes ribs 73. In one embodiment, ribs 73 are generally tubular and their primary axis extends parallel to primary axis 18 of level 10 (best shown in FIG. 2). Intermediate component 70, such as a magnetic component (e.g., certain types of steel), is placed against compressible component 72.

In one embodiment, magnet 60 is placed against a magnetic component 70. In an alternative embodiment, magnet 60 is placed in direct contact with compressible component 72.

Magnet 60 is placed against intermediate component 70, and, flange 68 is created, enclosing magnet 60 in chamber 74. During formation of flange 68, compressible component 72 is compressed, and the compressibility of rubber component 72 is utilized to create a biasing force that presses the components between floor surface 78 and the lower surface 94 of flange 68 such that the components are tightly held within chamber 74, and a distance between magnet 60 and base surface 14 is reduced. In one embodiment the distance between magnet 60 and base surface 14 is reduced as much as possible (e.g., minimized).

Flange 68 protrudes over chamber volume 80 and partially encloses magnet 60, securing magnet 60 in chamber 74. As can be seen in FIG. 2, in this arrangement, the diameter or width of chamber 74 measured at flange 68 is less than the width or diameter of chamber 74 measured below flange 68. Flange 68 includes a lower surface 94 that faces toward chamber floor 96 and toward magnet 60. In a specific embodiment, lower surface 94 engages an upper surface 98 of magnet 60 such that magnet 60 is retained within chamber 74. Flange 68 may be formed by pressing against bottom surface 14 of level 10 with sufficient pressure to deform the material in bottom surface 14. Flanges 68 extend from internal wall surface 76 towards a central axis 92 of chamber 74. In general, top surfaces 67 of flanges 68 are coplanar with or recessed relative to the working surface of the level in which the magnet is mounted. In a specific embodiment, working surface of level 10 is slightly elevated above top surfaces 67 of flanges 68 (best shown in FIG. 2).

In one embodiment, magnet 60 includes first magnet 64 and second magnet 66. The arrangement of poles for first and second magnet 64 and 66 are complimentary, with north pole 58 of first magnet 64 being disposed away from floor surface 78 and the north pole 58 of second magnet 66 being disposed towards floor surface 78, and intermediate component 70, such as a magnetic metal, below magnet 64, 66.

Although FIG. 2 illustrates chamber 74 being formed in bottom surface 14, chamber 74 may be formed in other surfaces as well, for example top surface 16 of level 10.

Figure 3:
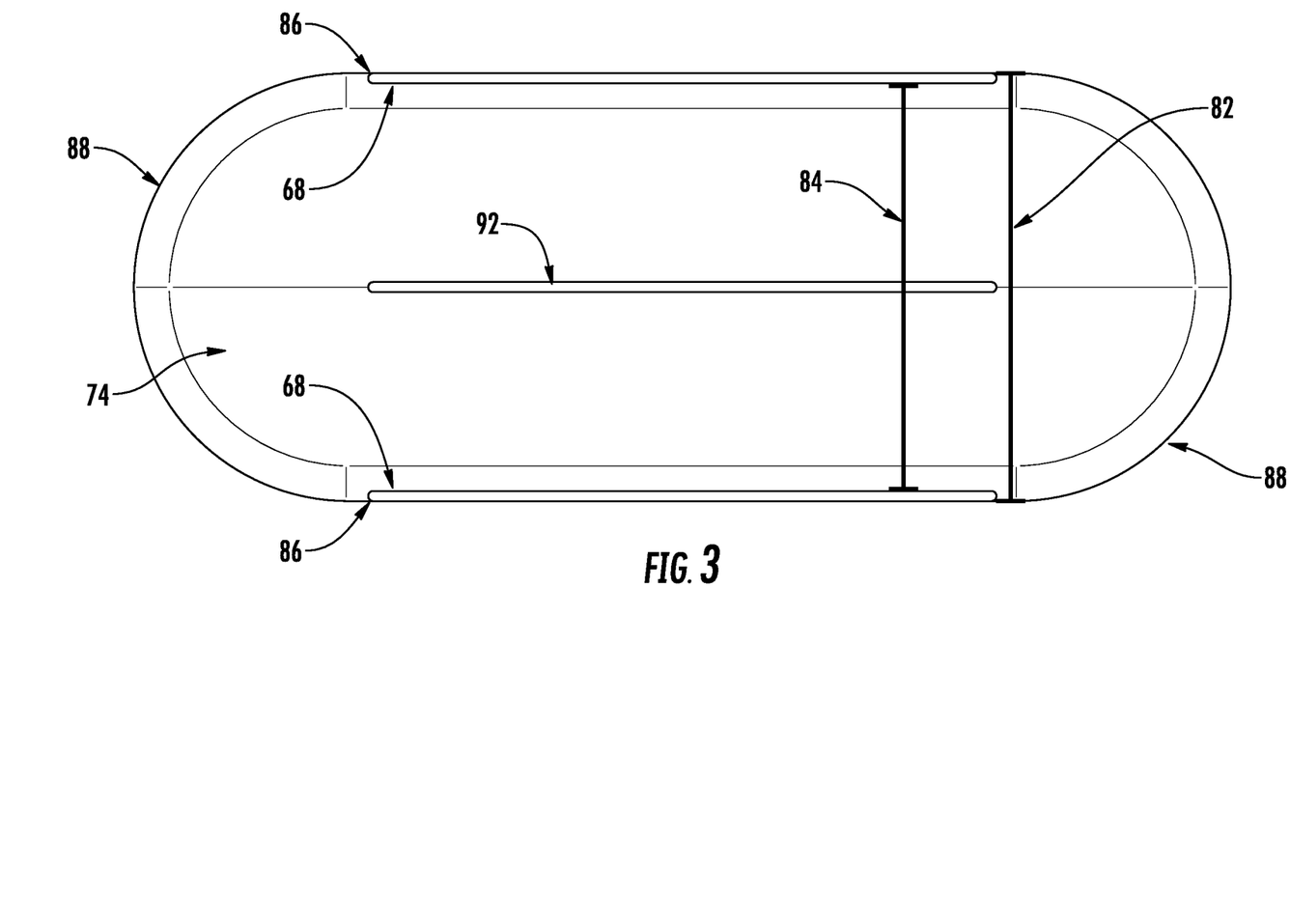
FIG. 3 is a top view of a magnet chamber according to an embodiment.

Referring to FIG. 3, in one embodiment, chamber 74 is elongate with two arcuate-shaped end surfaces 88 and connected by a pair of straight, parallel sidewalls 86. Flange 68 is formed by the depressing of bottom surface 14, resulting in flange 68 extending from internal wall surface 76 toward a central axis 92 of chamber 74. As a result of flange 68 being formed from material formerly in bottom surface 14 of level 10, bottom surface 14 of level 10 tapers below the remaining plane of bottom surface 14 to account for the material deformed into flange. In another embodiment, flange 68 is circular (best shown in FIG. 5). In yet another embodiment, there are six flanges 68 above chamber 74 (best shown in FIG. 6).

Figure 4:
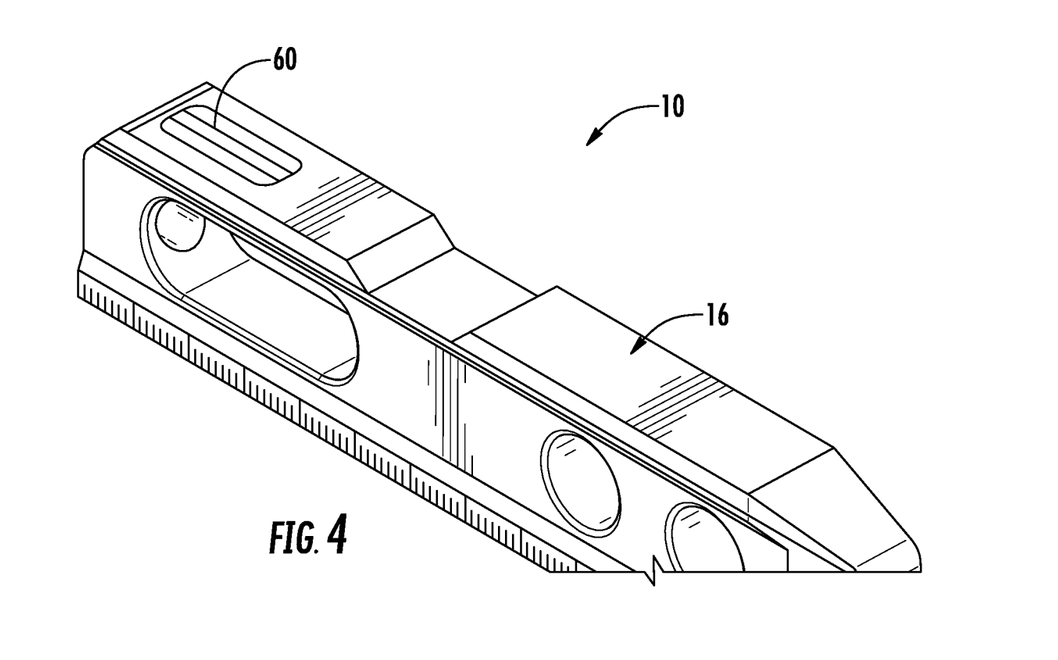
FIG. 4 is a perspective view of a level with a magnet chamber, according to an embodiment.

Illustrated in FIG. 4 is an exemplary embodiment in which magnet 60 is disposed within a top surface 16 of a non-extendable level 10. Working surfaces of level 10 may each include any number of magnets and/or magnetic surfaces as needed for a particular application, such as a single magnet (best shown in FIG. 4), two magnets, three magnets (best shown in FIG. 1), zero magnets (such as if the other surface has at least one magnet), etc.

In one embodiment, chamber 74 includes two flanges 68 that are distinct from each other (best shown in FIG. 3 in which flanges 68 are on opposite sides of chamber 74). In the embodiment in FIG. 3, flanges 68 are located on the straight walls 86 of chamber 74. However, flanges 68 may be located on arcuate shaped walls (e.g., end 88). Further, flange 68 may be a single continuous protrusion extending from internal wall surface 76 toward a central axis and that completely encircles chamber 74.

Figure 5:
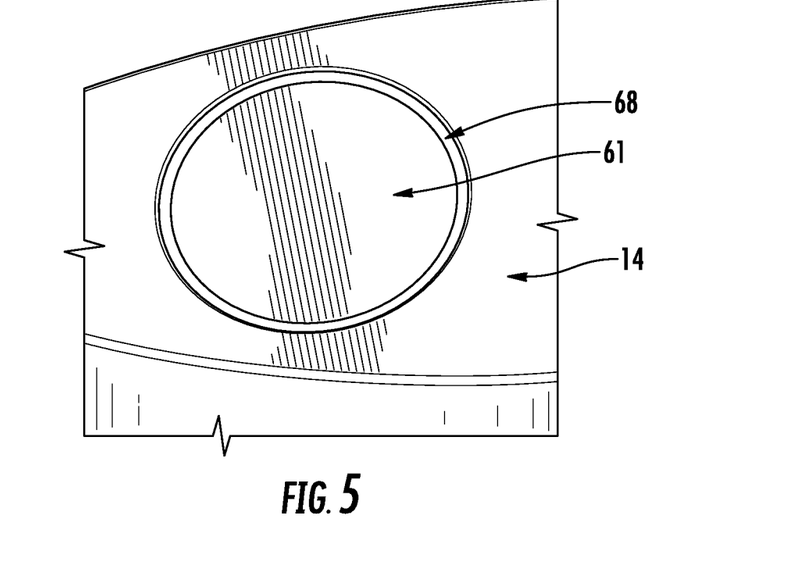
FIG. 5 is a perspective view of a magnet, according to an embodiment.

Illustrated in FIG. 5 is an exemplary embodiment in which magnetic circuit 61 is secured within chamber 74 by circular flange 68. In this embodiment, flange 68 surrounds the upper periphery of magnetic circuit 61. Similar to one or more other embodiments, working surface of level 10, in this case bottom surface 14, extends beyond flange 68 and magnetic circuit 61.

Figure 6:
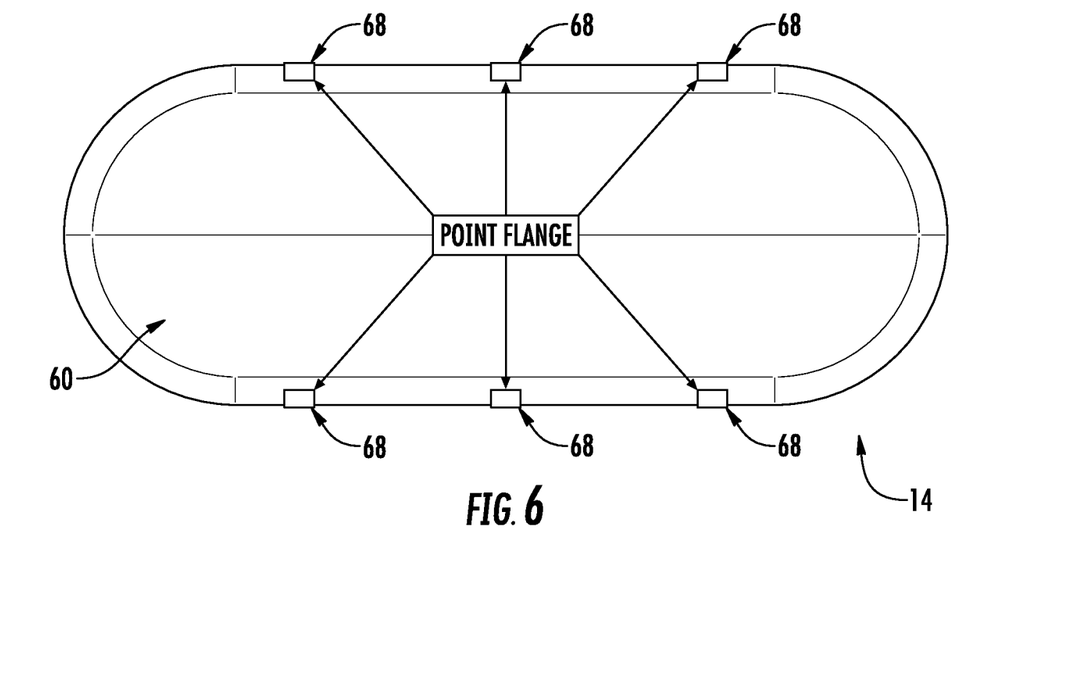
FIG. 6 is a top view of a magnet chamber, according to an embodiment.

Illustrated in FIG. 6 is an exemplary embodiment in which magnet 60 is secured within chamber 74 by six flanges 68. The six flanges 68 in FIG. 6 extend over chamber 74. In alternative embodiments, magnet 60 may be secured in chamber 74 by any number of flanges on either side of chamber 74 (e.g., FIG. 6 illustrates three flanges 68 on either side of chamber 74).

Figure 7:
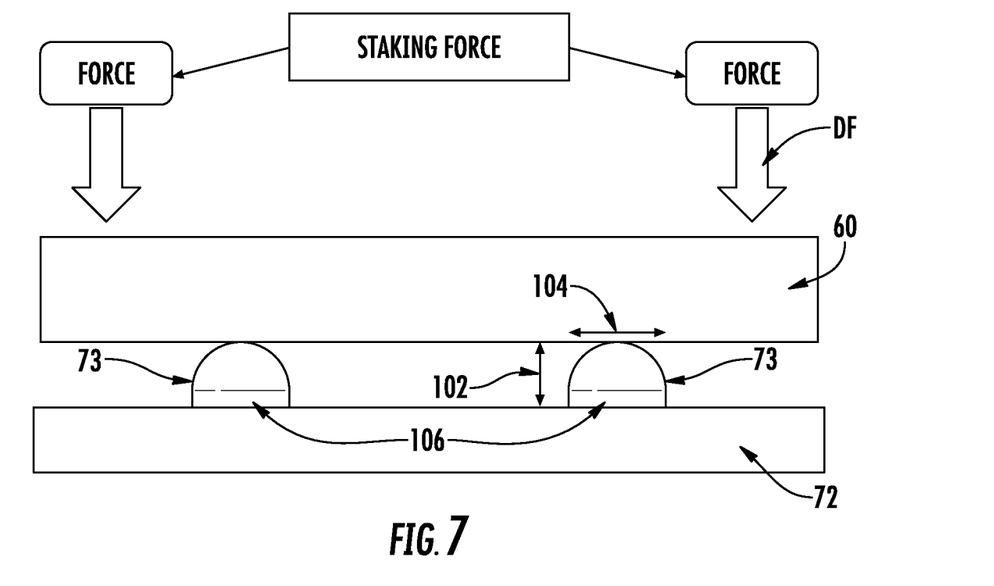
FIG. 7 is a cross-sectional view of a magnet chamber disposed in a bottom surface of a level, according to an embodiment.

Illustrated in FIG. 7 is an embodiment of compressible component 72. Magnet 60 is secured against compressible component 72 by downward force DF, such as that exerted by flanges 68. As a result, magnet 60 presses against ribs 73 of compressible component 72. Ribs 73 have a generally semi-circular cross-section with a rib height 102 and rib width 104. In the embodiment of FIG. 7, ribs 73 include a relatively short rib platform 106 upon which the semi-circular portion of ribs 73 lies above. In at least one specific embodiment, rubber of compressible component 72 and ribs 73 has a durometer measurement of 30 A-85 A. This arrangement and disposition of ribs 73 provides an even support base for magnet 60 (or magnetic circuit 61) across the entire engagement surface between magnet 60 (or magnetic circuit 61) and compressible component 72, and as a result, magnet 60 remains flat even while being pressed by flanges 68 against compressible component 72. In an alternative embodiment of compressible component 72 that provides a stable and even base, compressible component 72 may have a dimpled surface that is in contact with either magnet 60 or magnetic circuit 61. In another alternative embodiment of compressible component 72, compressible component 72 may have a honeycomb internal structure.

Figure 8:
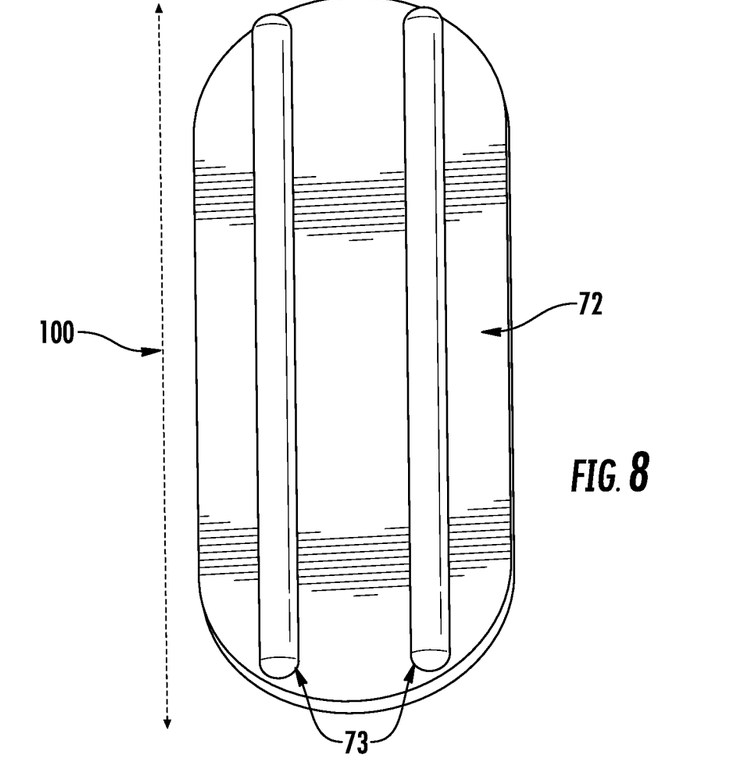
FIG. 8 is a perspective view of the compressible component in FIG. 7.

Illustrated in FIG. 8 is another view of the embodiment of compressible component 72 shown in FIG. 7. Ribs 73 extend along longitudinal axis 100 of compressible component 72, and are generally laterally evenly spaced from each other.

Figure 9:
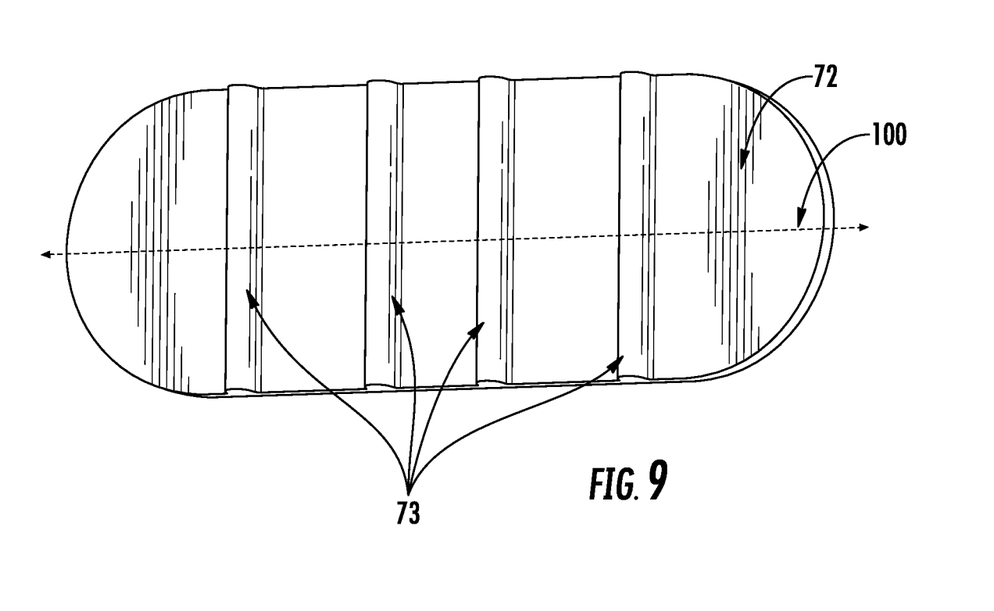
FIG. 9 is a perspective view of a compressible component, according to an embodiment.

In another embodiment, ribs 73 extend perpendicularly to longitudinal axis 100 of compressible component 72 (best shown in FIG. 9). In this embodiment, ribs 73 may still be generally laterally evenly spaced from each other.

Figure 10:
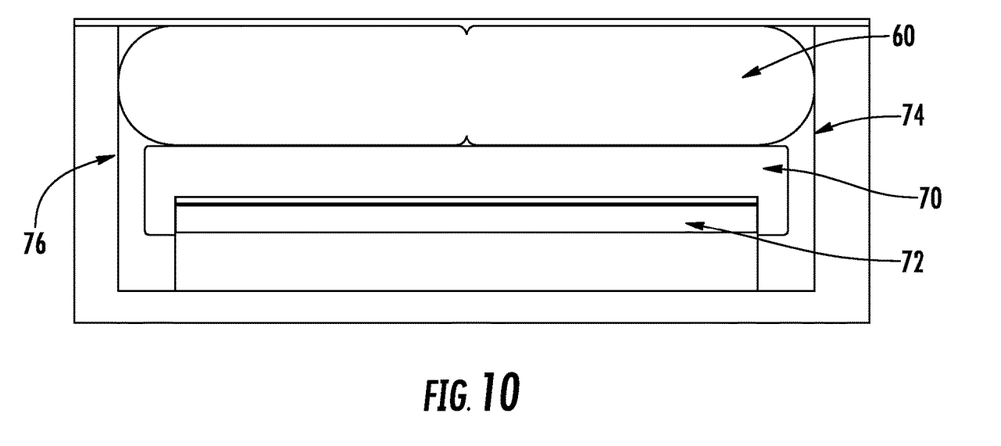
FIG. 10 is a cross-sectional view of a magnet chamber disposed in a bottom surface of a level, according to an embodiment.

FIG. 10 illustrates another embodiment of magnet 60, intermediate component 70, and compressible component 72 disposed within internal wall surface 76 of chamber 74.

In one or more other embodiments, compressible component 72 may be a material other than rubber, such as a steel spring plate.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more components or elements, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A level comprising:
    an orientation measuring component;
    a planar base surface;
    a top surface opposing the base surface;
    a first chamber formed in the base surface, the first chamber comprising:
        a chamber floor with a periphery;
        an internal wall extending from the chamber floor periphery to the base surface;
        a chamber volume defined by the internal wall and the chamber floor;
        a compressible component adjacent to the chamber floor;
        a magnet disposed in the chamber volume such that the compressible component is between the magnet and the chamber floor;
        a flange protruding outwardly from the internal wall toward a middle of the first chamber, the flange partially protruding over the chamber volume and partially over the magnet such that the flange retains the magnet within the chamber volume.

2. The level of claim 1, wherein the first chamber is elongate with two arcuate-shaped end walls connected by two straight parallel sidewalls, and wherein the flange includes two flanges, each of which extend along one of the two sidewalls.

3. The level of claim 1, wherein the flange includes two flanges, and wherein the internal wall has a first diameter at a first location between the two flanges, the first diameter being less than a second diameter that is directly below the two flanges.

4. The level of claim 1, wherein the magnet comprises a first magnet and a second magnet, each of which have a north pole and a south pole, the north pole of the first magnet being disposed away from the chamber floor and the north pole of the second magnet being disposed towards the chamber floor.

5. The level of claim 1, wherein the first chamber is disposed in the base surface proximate a first end of the level, the level further comprising:
    a second chamber formed in the base surface near a second end of the level, the second chamber including:
        a chamber floor with a periphery;
        an internal wall extending from the chamber floor periphery to the base surface;
        a chamber volume defined by the internal wall and the chamber floor;
        a compressible component adjacent to the chamber floor;
        a magnet disposed in the chamber volume such that the compressible component is between the magnet and the chamber floor;
        a flange that protrudes outwardly from the internal wall toward a middle of the second chamber, the flange partially protruding over the chamber volume; and
    a third chamber formed in the base surface near a middle of the level, the third chamber including:
        a chamber floor with a periphery;
        an internal wall extending from the chamber floor periphery to the base surface;
        a chamber volume defined by the internal wall and the chamber floor;
        a compressible component adjacent to the chamber floor;
        a magnet disposed in the chamber volume such that the compressible component is between the magnet and the chamber floor;
        a flange that protrudes outwardly from the internal wall toward a middle of the third chamber, the flange partially protruding over the chamber volume.

6. The level of claim 1 wherein the orientation measuring component is a level vial supported between the base surface and the top surface.

7. The level of claim 1, the level further comprising a magnetic component between the magnet and the compressible component, wherein the compressible component comprises ribs that engage with the magnetic component.

8. The level of claim 7, wherein the ribs are axially aligned with a longitudinal axis of the compressible component.

9. The level of claim 8, wherein the compressible component comprises rubber with a Shore durometer of 30 A and 85 A.

10. The level of claim 7, wherein the ribs are axially aligned perpendicular to a longitudinal axis of the compressible component.

11. The level of claim 1, wherein the flange is generally circular and peripherally surrounds the first chamber.

12. A level comprising:
    a planar base surface;
    a top surface opposing the base surface;
    a level vial supported between the base surface and the top surface;
    a first chamber formed in the base surface, the first chamber comprising:
        a chamber floor with a periphery;
        an internal wall extending from the chamber floor periphery to the base surface;
        a chamber volume defined by the internal wall and the chamber floor;
        a compressible component adjacent to the chamber floor;
        a magnet disposed in the chamber volume such that the compressible component is between the magnet and the chamber floor;
        a flange that protrudes outwardly from the internal wall toward a middle of the first chamber, the flange partially protruding over the chamber volume, wherein the flange includes two flanges, and wherein the internal wall has a first diameter at a first location between the two flanges, the first diameter being less than a second diameter that is directly below the two flanges.

13. The level of claim 12, wherein the first chamber is elongate with two arcuate-shaped end walls connected by two straight parallel sidewalls.

14. The level of claim 13, wherein the flange for the first chamber includes two flanges, each of which extend along one of the respective two sidewalls.

15. The level of claim 12, wherein the magnet comprises a first magnet and a second magnet, each of which have a north pole and a south pole, the north pole of the first magnet being disposed away from the chamber floor and the north pole of the second magnet being disposed towards the chamber floor.

16. The level of claim 12, the level further comprising a magnetic component between the magnet and the compressible component, wherein the compressible component comprises ribs that engage with the magnetic component.

17. The level of claim 16, wherein the ribs are axially aligned with a longitudinal axis of the compressible component.

18. The level of claim 16, wherein the ribs are axially aligned perpendicular to a longitudinal axis of the compressible component.

19. A level comprising:
an orientation measuring component;
a planar base surface;
a top surface opposing the base surface;
a first chamber formed in the base surface, the first chamber comprising:
    a chamber floor with a periphery;
    an internal wall extending from the chamber floor periphery to the base surface;
    a chamber volume defined by the internal wall and the chamber floor;
    a compressible component adjacent to the chamber floor;
    a magnet disposed in the chamber volume such that the compressible component is between the magnet and the chamber floor;
    a flange that protrudes outwardly from the internal wall toward a middle of the first chamber, the flange partially protruding over the chamber volume.

20. The level of claim 19, wherein the first chamber is disposed in the base surface proximate a first end of the level, wherein the magnet comprises a permanent magnet and a ferromagnetic sleeve located in the first chamber.

* * * * *